United States Patent Office 3,326,060
Patented June 20, 1967

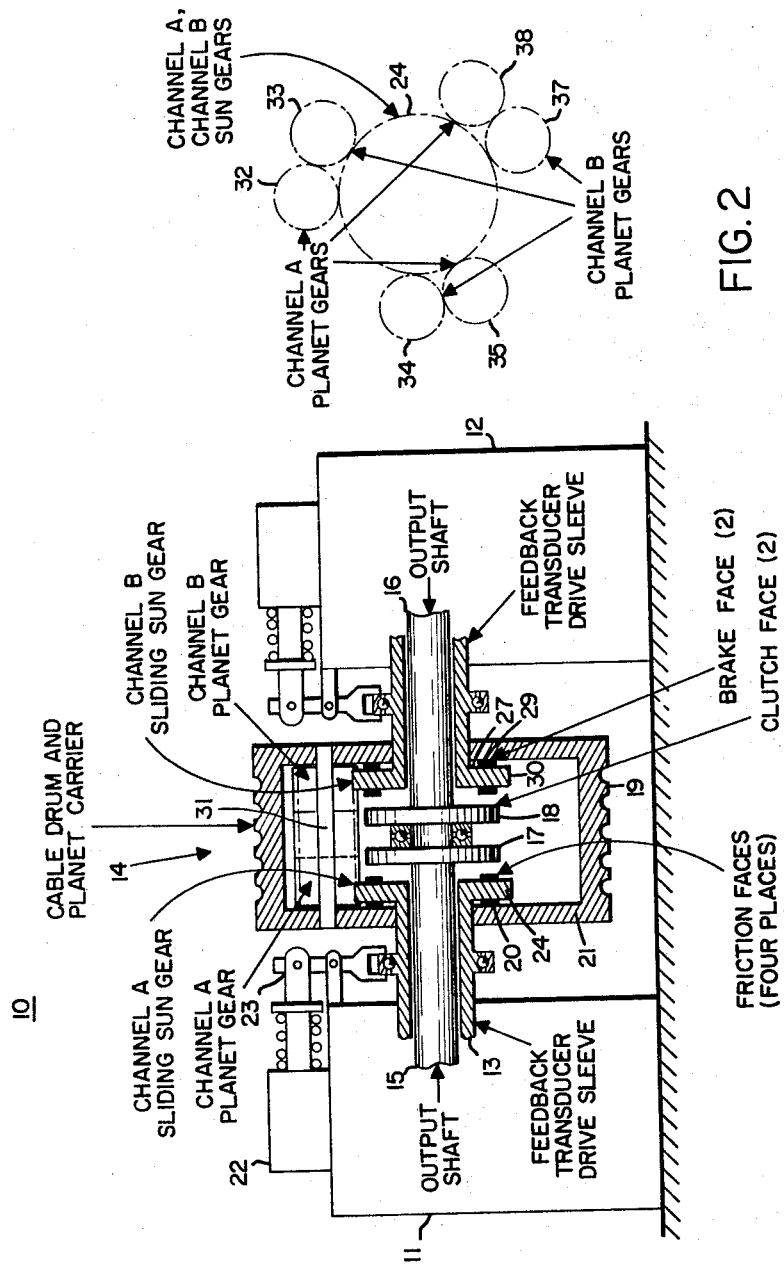

3,326,060
CONTROL APPARATUS
Robert F. Rasmussen, Brooklyn Center, Minn., assignor to Honeywell, Inc., Minneapolis, Minn., a corporation of Delaware
Filed May 28, 1965, Ser. No. 459,548
9 Claims. (Cl. 74—675)

ABSTRACT OF THE DISCLOSURE

The arrangement pertains to operating means for a cable drum and comprises two electrically operated servomotors having their output shafts on the same axis. The motors are laterally spaced to provide accommodation for an output drive connected between each servomotor shaft and to the cable drum.

Each shaft supports an axially movable sleeve having at one end a differential sun gear that meshes at all times with a planet gear. Each planet gear also meshes with the planet gear that meshes with the other sun gear. The planet gears are mounted interiorly of the drum on spindles that are supported in the end walls of the drum.

Each shaft at an end within the drum supports a flange, and each sun gear may be selectively brought into contact with its related flange for driving action from the motor shaft to a sun gear. When not in such contact, each sun gear is locked to the adjacent end wall of the drum, whereby with both sun gears rotated by their motors, the drum rotates in accordance with the average speed of the two motors, but with one sun gear driven and the other locked to the cable drum, the drum rotates at the speed of the driven sun gear.

---

This invention relates to manually and power operated control apparatus for dirigible crafts such as aircraft and in particular relates to the design area of such apparatus for increasing the reliability in the power means that operates control surfaces of such craft.

An object of this invention is to provide increased reliability in control apparatus through an improved dual redundant servo actuator means for a dirigible craft.

A further object of this invention is to provide an improved dual controlled servo utilizing two conventional actuators coupled in a manner which is compatible with the dual channel aircraft autopilot operational and fail-safety techniques.

A further object of this invention is to provide an improved method of mechanically coupling two servo actuator units into an existing aircraft surface control system.

A further object of this invention is to provide a dual servomotor which includes a pair of input members and output member, with no loss in gain between an input member and the output member upon failure of drive in the other input member.

Another object of the invention is to provide in a dual redundant actuator, a novel arrangement in a spring clutch type of power transmitting device between a drive shaft sun wheel and a planetary carrier.

Other objects and advantages of the invention will become apparent during a reading of the specification with reference to the accompanying drawing wherein:

FIGURE 1 is a side view of the dual rotary servos with constant gain clutch mechanism; and FIGURE 2 shows a schematic of a portion of the mechanism.

The dual electric servo of the control apparatus consists of two standard rotary servo actuators connected through a gear box to a cable drum for positioning a control surface of an aircraft. Each of the output shafts of the servo actuators is connected into a sliding gear-clutch-brake combination which is solenoid operated in which said sliding gear forms a mechanical differential sun wheel in the gear box. Within the gear box are three pairs of planet gears or wheels one gear of each pair connected in driving relation with one sun gear and the remaining three gears of each of the three pairs being connected to the other sun gear. The gears of each pair intermesh. The three pairs of planet gears are supported in a planet carrier in such manner as to distribute output torques and minimize friction. The exterior of the planet carrier is integrally connected to the cable drum from which operating cables extend to a control surface.

In the clutched position, each sun gear is driven by its shaft whereas in the braked condition each sun gear is frictionally locked to the planet gear carrier. With both sun gears in clutched condition and with the two drive shafts operating at the same rate, the planet carrier rotates at the same speed as the sun gears. In the event, through malfunction, one sun gear is in the clutched condition while the other is in the braked condition, the planet gear carrier rotates at the same speed as the driven sun wheel.

A dual redundant servomotor broadly is not new herein and an example of a redundant servomotor is shown in a patent to Borgeson et al. 3,143,042 wherein in FIGURE 1 there is a redundant arrangement for operating a control surface of an aircraft including an autopilot channel A, an autopilot channel B which through a redundant servo 204 is used for operating an aircraft control surface 214. In the present arrangement, output member corresponding with output 208 of redundant servo 204 of the patent is operated from two electric servomotors through a novel coupling unit.

Referring to FIGURE 1, the novel dual electric servo 10 consists of a first rotary actuator 11, a second rotary actuator 12, and a novel coupling unit or gear box 14 receiving inputs from the actuators 11 and 12 and operating in turn a cable drum 19 for operating cables of the control surface. It will be understood that the control system channel A servomotor 11 and the control system channel B servomotor 12 include a gear box and a feedback transducer. The feedback trandsucer is conventional as in FIGURE 1 of Borgeson et al. 3,143,042; see Lines 203–207 for system rebalance puroposes. Motor 11 includes an output shaft 15 and motor 12 includes an output shaft 16. Shaft 15 carries a circular flange 17. Intermediate flange 17 and a side wall 20 of a planet wheel carrier 21 is a sun wheel or gear 24 carried by a feedback transducer drive sleeve 13. The drive sleeve and sun wheel are axially movable by means of a channel A engaged solenoid 22 of the pull type through suitable linkage 23. In the brake position of sun wheel 24, a friction surface thereon engages the side wall 20 of carrier 21 and locks the sun wheel against relative movement with respect to the carrier. In the clutched position, friction faces on the opposite side of the sun wheel 24 are forced against the circular flange 17 thereby connecting in driving relationship the sun wheel 24 with the servo drive shaft 15.

In a similar manner but associated with actuator 12, a second sun wheel 27 has a clutched-braked association or relationship between a circular plate 18 on actuator output shaft 16 and a side wall 29 of the planet carrier 21 respectively.

The planet carrier 21 has a plurality of spindles 31, only one of which is shown, mounted in side walls 20, 29. The spindles are parallel with the drive shafts 15, 16. On one spindle 31 is a spur gear 32. Mounted on a second spindle circumferentially or angularly displaced from spindle 31 in walls 20, 29 is a second spur gear or idler 33 which meshes with idler wheel 32 to form a pair of planet wheels.

In FIGURE 2 three pairs of planet wheels or idler gears are illustrated associated with the sun wheels 24, 30. The planet wheels 32, 33 form one pair, planet wheels 34, 35 form a second pair, and planet wheels 37, 38 form the third pair. All of the planet wheels are thus mounted on spindles supported in carrier 21. As shown in FIGURE 1, the planet wheels 32, 33 axially overlap so that the planet gear 32 associated with sun wheel 24 meshes with the planet wheel 33 interconnected with the sun wheel 30. A similar relationship is provided for planet wheels 34, 35; 37, 38 of the remaining two pairs.

*Operation*

Upon the selective energization of engage solenoid 22 of the A channel and the engage solenoid of the B channel, sun wheels 24, 30 are axially moved to engage the circular members 17, 18 of the respective drive shafts 15, 16, whereby the sun wheels 24, 30 are operatively connected to these drive shafts 15, 16 and disengaged from locking relationship with the end or side walls of planet carrier 21. Assuming that servos 11 and 12 are controlled by autopilot sections as 201, 205 of the Borgeson et al. Patent 3,143,042 under the same control signals, the rotation rates of the actuators 11 and 12 are the same. Thus shaft 15 operates its sun wheel 24 to drive the related planet wheels. Similarly, drive shaft 16 through its sun wheel 30 drives the planet wheels associated with it. Viewed from the side as in FIGURE 1, the sun wheels 24, 30 move in the same direction. Since the planet wheels in each of the three pairs are driven at the same rotational rate, they tend to rotate merely about their respective spindles but since at the meshing point of the pair of planet wheels their rotation is opposite planetary action takes place so that the carrier member 21 operates at the same rotational rate as the sun wheels.

In the event that one sun wheel rotates at a greater rate than the other, the planet carrier 21 due to the planetary action resulting from the difference in rotation rate of the sun wheels 24, 30 is driven at a rate which is the average rotational rate of that of the two sun wheels.

In the event that one engaged solenoid is not energized so that its sun wheel is locked to the end wall of carrier 21 while the other engaged solenoid is energized to effect a driving connection between its sun wheel and drive shaft, the carrier member 21 is rotated at the same rate as the driven sun wheel due to the locking action applied to the other sun wheel which in turn locks the pairs of planet wheels. Thus no loss in gain results when one sun wheel drives while the other does not.

This is an advantage over other arrangements which use a differential linkage wherein the opposed ends are given rectilinear movement by their respective servo actuators while the intermediate point of the differential linkage serves as an output member to position a further link. In such an arrangement, failure of one servo actuator to operate even though the other actuator is operating results in a reduction in gain to the output member.

Summarizing the operation, with both engage solenoids energized, the sun gears are linearly moved to be coupled in driving or operative relation to the respective servomotor output shafts and released from their respective brakes, and the planet carrier (cable drum) 21 assumes a position which is the average of the two actuator change in displacements. If one actuator is disengaged from its sun wheel, by external monitoring means, by sliding the sun gear by spring force (not shown) against the brake face on the inside of the planet carrier 21, this "locks up" the differential gear so that the actuator remaining in service drives the cable drum and carrier 21 directly. This drive is effected without any loss in gain.

If both actuators are disengaged, the entire differential gear box (inside the planet carrier 21) is free to rotate about its center with the planet carrier with no gear meshes adding friction to the system. If the dual servo 10 be utilized in a parallel system in an aircraft wherein operation of the cable drum by carrier 21 results in movement of the manual control stick of the aircraft, with both actuators now disengaged, no gear meshes add friction to the system under manual control from the control stick.

It will now be apparent that I have provided a novel dual servo wherein two actuators are connected through a novel mechanical coupling to an output member to provide redundant actuation of the output member wherein a functional failure in one channel results in no loss in gain of the displacement of the output member.

What is claimed:

1. A coupling unit for connecting two rotating servo actuators to provide a dual controlled output drive comprising:
    a planet gear carrier;
    a pair of planet, spur gears rotatably supported on different axes by the carrier and intermeshing;
    a sun gear meshing with one planet gear;
    a second sun gear meshing with the other planet gear;
    a drive shaft of one actuator for one sun gear;
    a second drive shaft from the other actuator for the other sun gear; and
    means for moving each sun gear from a position wherein it is frictionally locked to the planet gear carrier to a position where it is driven by its drive shaft, whereby the planet gear carrier which is the output of the dual control servo is given a displacement that is the average of the displacements of the two sun gears.

2. A differential gear arrangement for coupling two servo actuators whereby to provide a dual control servo comprising:
    a planet gear carrier;
    a pair of planet gears rotatably supported on different spindles by the carrier and intermeshing;
    a sun gear meshing with one planet gear;
    a second sun gear meshing with the other planet gear;
    a drive shaft of one actuator for one sun gear;
    a second drive shaft of the second actuator for the other sun gear; and
    means for alternatively frictionally locking each sun gear to the planet gear carrier or connecting it in driving relation to its drive shaft, whereby upon the friction engagement of one sun gear with the planet carrier while said other sun gear is driven from its drive shaft the planet carrier rotates at the same rate as the sun gear connected in driving relation with its drive shaft, thereby resulting in low loss and gain in the dual servo resulting from non-driving of the other sun gear.

3. A dual operated electric servo comprising:
    two rotary actuators;
    two sun gears;
    a planet gear carrier having intermeshing planet gears respectively meshing also with the sun gears;
    a clutch-brake alternatively interconnecting each sun gear to an actuator or to the planet gear carrier;
    means for operating each clutch-brake; and
    a cable drum operated by the planet gear carrier to position a control surface of an aircraft.

4. A differential coupling arrangement between two drive shafts comprising a sun gear slidably mounted on the end of each shaft;
    a planetary carrier;
    idler gear means rotatably supported in the carrier and intermeshing with both of said sun gears; and
    selective means for connecting in driving relation each sun gear with its drive shaft or in locking relation to said carrier, whereby when both gears are in driving relation with their shafts the carrier member rotates at a speed which is the average of the rotation rates of said two drive shafts but when one gear only is in driving relation with its shaft while the other is locked to the carrier, the carrier with the undriven shaft rotates at a speed equal to that of the driven gear.

5. A unit for coupling two servo actuators to an output means comprising:
- an epicyclic drive train including sun and planet wheels in said unit including a planet wheel carrier connected to said output means;
- two planet wheels rotatably mounted in said carrier in spaced relation but in circumferential contact;
- a sun wheel for driving one planet wheel;
- a second sun wheel for driving the other planet wheel;
- means for selectively connecting one sun wheel in driving relation to one servo actuators;
- means for selectively connecting the other sun wheel with the other servo actuator; and
- means locking each sun wheel to the planet carrier when it is not in said driving relation to permit substantially friction free rotation of said carrier when neither sun wheel is driven.

6. A unit for coupling two servo actuators to manually operable aircraft surface positioning means comprising:
- a planet wheel carrier connected to said positioning means;
- planet wheel means rotatably mounted in said carrier;
- a rotatable sun wheel engaging said planet wheel means;
- a second rotatable sun wheel engaging said planet wheel means;
- means for selectively connecting one rotatable sun wheel in operating relation to one servo actuator;
- means for selectively connecting the other sun wheel in operating relation with the other servo actuator; and
- means for frictionally locking each sun wheel to the planet wheel carrier when it is not in said operating relation to permit substantially friction free manual displacement of said positioning means when neither sun wheel is in said operative relation.

7. In a dual control servomotor coupling unit, a differential gear arrangement comprising:
- a planet gear carrier;
- a pair of planetary spur gears rotatably supported by the carrier on circumferentially spaced axes and intermeshing;
- a sun gear meshing with one planetary gear;
- a second sun gear meshing with the other planetary gear;
- a shaft for one sun gear;
- a second shaft for the other sun gear;
- means for selectively connecting in operating relation one sun gear with one shaft;
- means for selectively connecting in operating relation the other sun gear with the other shaft; and
- means for locking each sun gear to the planet carrier when not in said operating relation.

8. In a dual servomotor coupling unit, a differential gear arrangement comprising:
- a planet gear carrier;
- three pairs of planet spur gears rotatably supported by the carrier on six angularly spaced axes each pair of gears intermeshing;
- a sun gear meshing with a planet gear of all three pairs;
- a second sun gear meshing with the other planet gears in the three pairs;
- a drive shaft for one sun gear;
- a second drive shaft for the other sun gear; and
- means for moving each sun gear from a position wherein it is frictionally locked to the planet gear carrier to a position where it is driven by its drive shaft, said three pairs of planet gears serving to form a balanced connection between the planet carrier and the two sun gears.

9. In dual servomotor coupling unit, a differential gear arrangement comprising:
- a planet gear carrier;
- plural pairs of planet spur gears rotatably supported by the carrier on plural pairs of angularly spaced axes each pair of gears intermeshing;
- a sun gear meshing with a planet gear of all plural pairs;
- a second sun gear meshing with the other planet gears in the plural pairs;
- a drive shaft for one sun gear;
- a second drive shaft for the other sun gear; and
- means for moving each sun gear from a position wherein it is frictionally locked to the planet gear carrier to a position where it is driven by its drive shaft, said plural pairs of planet gears serving to form a balanced connection between the planet carrier and the two sun gears.

References Cited

UNITED STATES PATENTS

| | | | |
|---|---|---|---|
| 2,754,694 | 7/1956 | Schoenrock | 74—710 X |
| 3,127,791 | 4/1964 | Roe | 74—675 |
| 3,254,543 | 6/1966 | Donath | 74—710 |
| 3,260,133 | 7/1966 | Mattson | 74—675 |

FOREIGN PATENTS 298,450  10/1928  Great Britain.

ROBERT M. WALKER, *Primary Examiner.*

DONLEY J. STOCKING, *Examiner.*

L. H. GERIN, *Assistant Examiner.*